United States Patent
Greene

(10) Patent No.: US 6,397,484 B1
(45) Date of Patent: Jun. 4, 2002

(54) LASER-EMITTING PLUMB-BOB

(76) Inventor: Daniel J Greene, 1511 Fall River Ave. P.O. Box 186, Seekonk, MA (US) 02771

( * ) Notice: Subject to any disclaimer, the term of this patent is extended or adjusted under 35 U.S.C. 154(b) by 0 days.

(21) Appl. No.: 09/436,173

(22) Filed: Nov. 8, 1999

(51) Int. Cl.[7] .............................................. G01C 15/10
(52) U.S. Cl. .................................. 33/392; 33/DIG. 21
(58) Field of Search ......................... 33/227, 286, 348, 33/392, DIG. 21

(56) References Cited

U.S. PATENT DOCUMENTS

| | | | |
|---|---|---|---|
| 2,538,475 A | * 1/1951 | Skrastin, Jr. .................. | 33/348 |
| 2,583,491 A | * 1/1952 | Orlando ........................ | 33/393 |
| 2,665,498 A | * 1/1954 | Mitchell ....................... | 33/348 |
| 3,113,387 A | * 12/1963 | Bean, Jr. ...................... | 33/392 |
| 3,720,001 A | * 3/1973 | Majewski ...................... | 33/392 |
| 4,106,207 A | * 8/1978 | Boyett et al. ................. | 33/286 |
| 4,597,186 A | 7/1986 | Markos ......................... | 33/392 |
| 4,625,428 A | 12/1986 | Griffin ......................... | 33/392 |
| 5,012,585 A | 5/1991 | DiMaggio ...................... | 33/227 |
| 5,163,229 A | 11/1992 | Cantone ........................ | 33/227 |
| 5,481,809 A | * 1/1996 | Rooney ................... | 33/DIG. 21 |
| 5,566,459 A | * 10/1996 | Breda .................... | 33/DIG. 21 |
| 5,644,850 A | 7/1997 | Costales ....................... | 33/286 |
| 5,754,287 A | 5/1998 | Clarke .......................... | 33/227 |
| 6,028,665 A | * 2/2000 | McQueen ....................... | 33/286 |

* cited by examiner

Primary Examiner—G. Bradley Bennett
(74) Attorney, Agent, or Firm—Michael I Kroll

(57) ABSTRACT

The present invention 10 discloses a conventionally shaped plumb-bob containing an internal laser emitting member 34 contained in a cylindrically shaped compartment 56 being battery 64 operated. The lower tip 30 of the present invention is threadably 38 connected to the main housing 36 and has an aperture 48 therein through which the laser beam 22 is emitted wherein the beam 22 is aligned with the target point 18. An on/off switch 24 is provided along with a rechargeable receptacle 26 for the battery. Attachment means 28 for the plumb-bob line 20 is provided on the upper, wider top of the plumb-bob.

1 Claim, 7 Drawing Sheets

LASER-EMITTING PLUMB-BOB

BACKGROUND OF THE INVENTION

1. Field of the Invention

The present invention relates generally to vertical alignment devices and, more specifically, to a laser beam emitting plumb-bob. A conventional plumb-bob consists of a substantially conical weighted object wherein the upper, wider portion has a centrally located means for securing a suspension line. The suspension line has a lower end which is secured to the plumb-bob and an upper end that is placed at the point with which vertical alignment is desired in a manner that leaves the plumb-bob freely suspended with the lower, tapered portion indicating the point of alignment.

The plumb-bob is an indispensable tool for carpenters, masons and the like, but can be somewhat inaccurate due to oscillation of the plumb-bob from factors such as wind, line tension, line length, physical contact etc. Prior art has addressed this problem by placing downward projecting incandescent lighting within conventional plumb-bobs to improve the accuracy by projecting a beam indicating the point of vertical alignment. However, incandescent lighting is limited in accuracy due to the dispersion of the projected beam which increases as the distance from the target surface increases. A further drawback is the large power requirements of incandescent lighting requiring prior art light-emitting plumb-bobs to include various means or preventing accidental battery drainage.

In addition, a further drawback to incandescent lighting is that it mimics natural light therefore, during daylight it would be difficult to tell that it was on unless your staring into the tip.

Further, the laser beam emitting device having a soft touch on/off switch provides means for using the device as a pointer to indicate remote locations or objects.

2. Description of the Prior Art

There are other lighted devices designed for vertical alignment. Typical of these is U.S. Pat. No. 4,597,186 issued to Peter Marcos on Jul. 1, 1986.

Another patent was issued to Gerald E. Griffin et al. on Dec. 2, 1986 as U.S. Pat. No. 4,625,428. Yet another U.S. Pat. No. 5,012,585 was issued to Charlie J. Damage on May 7, 1991 and still yet another was issued on Nov. 17, 1992 to Giovanni F. Cantone as U.S. Pat. No. 5,163,229.

Another patent was issued to Straf G. Costales on Jul. 8, 1997 as U.S. Pat. No. 5,644,850. Yet another U.S. Pat. No. 5,754,287 was issued to Douglas A. Clarke on May 19, 1998. Another was issued to Douglas A. Clarke on May 19, 1998 as U.S. Pat. No. 5,754,287.

A plumb-bob having a built-in light source and electrical power supply including a main barrel, a conical tip and a screw cap. Tightening of the screw cap closes the circuit for operation of the light source. A suspension line extends from the cap and is stored when not in use between the cap and barrel where it serves to prevent tightening of the cap and light source actuation.

An improved plumb-bob having a downwardly directed light beam to indicate the point directly below the plumb-bob. The light is operated by batteries within the plumb-bob and, in order to prevent undesired draining of the batteries, the light is switched on and off by the weight of the plumb-bob acting on the line. The switch is activated by a conductive spring held within the plumb-bob.

An apparatus is set forth for providing vertical alignment and indication of fixture positioning within a dwelling relative to a floor plan reference point, wherein the apparatus includes a laser oscillator mounted within a lower first housing coaxially aligned through a second and third upper coaxially aligned to focus a laser beam onto the ceiling surface of the associated dwelling. A spherical housing is provided medially of the coaxially aligned first and second housings and includes support members for positioning of the housing upon a support surface, such as a floor, or optionally utilizes ring members and associated tether lines to suspend the organization relative to vertical support surfaces.

A device is disclosed for accurately and precisely locating specific points on ceilings or, alternatively, on the same horizontal plane. A light emitting means, a pendulum, a support, and two cylindrical rods act in concert to provide a light beam that is always plumb or horizontally level.

A laser plumb device comprising a facility for emitting two narrow light beams and in which the light beams arc opposite and aligned to each other. A structure is (or supporting the light emitting facility in a vertical position. When the supporting structure is placed over a layout mark upon a floor under a ceiling in a building, the light emitting facility will cast the first narrow beam onto the layout mark upon the floor and will simultaneously cast the second narrow light beam onto the ceiling to transfer the layout mark from the floor onto the ceiling.

A plumb apparatus is described in two embodiments having common operational and construction features. In a first embodiment, a beam projector is mounted within an upper end of an elongate pipe which is slidingly fit in an angular, pivot able mounting. The lower end of the pipe is formed with a point adapted to contact a target point on a supporting surface when a base in which the angularly pivotable mounting is held is placed on the surface. A bi-axial level is attached to the upper end of the pipe to ascertain vertical orientation of the pipe, which orientation is maintained by the weight of the base structure which is in contact with the supporting surface. The beam projector is activated to project a beam to a target point on the ceiling above. According to the second preferred embodiment, a beam projector is mounted into an upper end of a pipe, the lower end of which is mounted into a ball. The ball is placed into a cup which is engaged by a clamp cover having an opening through which the pipe extends. A bi-axial level is attached to the upper end of the pipe to ascertain vertical orientation of the pipe, which orientation is maintained by screwing the clamp cover to prevent further pivoting of the ball.

While these lighted vertical alignment devices may be suitable for the purposes for which they were designed, they would not be as suitable for the purposes of the present invention, as hereinafter described.

SUMMARY OF THE PRESENT INVENTION

The present invention discloses a conventionally shaped plumb-bob containing an internal laser emitting member contained in a cylindrically shaped compartment being battery operated. The lower tip of the present invention is threadably connected to the main housing and has an aperture therein through which the laser beam is emitted wherein the beam is aligned with the target point. An on/off switch is provided along with a rechargeable receptacle for the battery. Attachment means for the plumb-bob line is provided on the upper, wider top of the plumb-bob.

A primary object of the present invention is to provide a laser beam emitting plumbbob having a laser beam emitting device contained therein.

Another object of the present invention is to provide a laser beam emitting plumb-bob having a compartment having an electrical connection socket for inserting a laser beam emitting device therein.

Yet another object of the present invention is to provide a laser beam emitting plumb-bob having a compartment having a keyway for inserting a laser beam emitting device having an external key way mating structure thereon.

Still yet another object of the present invention is to provide a laser beam emitting plumb-bob having a removable tip providing access to the compartment for removal or insertion of a laser beam emitting device.

Another object of the present invention to provide a laser beam emitting plumb-bob having a removable/replaceable laser beam emitting device contained therein.

Yet another object of the present invention is to provide a plumb-bob having a soft touch switch for controlling the on/off condition of the laser beam emitting device.

Still yet another object of the present invention is to provide a laser-emitting plumb-bob with replaceable one piece laser cylinder to allow for fast easy repairs when a laser malfunction occurs.

Another object of the present invention is to provide a laser-emitting plumb-bob with replaceable laser cylinder and battery unit to enable a user to change the color of the beam to distinguish one beam from the other when using multiple laser-emitting plumb-bobs.

Yet another object of the present invention is to provide a laser-emitting plumb-bob that could also be used as a conventional plumb-bob.

Still yet another object of the present invention is to provide a soft touch on/off switch that will mate contacts between the switch mechanism and the laser battery unit thereby effectively completing the circuit and activating the laser beam.

Another object of the present invention is to provide a plumb-bob having an exterior electrical connection receptacle having connection means with the power source whereby the power source can be re-energized without removing the laser beam emitting device.

Additional objects of the present invention will appear as the description proceeds.

The present invention overcomes the shortcomings of the prior art by providing a laser beam emitting plumb-bob having a removable/replaceable laser beam emitting device having a rechargeable power source having an soft touch on/off switch. The laser beam emitting plumb-bob has a removable tip having an aperture where through the beam passes. the removable tip provides means for removal and replacement of the laser beam emitting member which also has a rechargeable power source. The compartment within the plumb-bob has an electrical receptacle for plugging the laser beam emitting member into, as well as, a key slot which mates with the laser beam emitting devices exterior keyed structure. There is also a soft touch on/off switch exteriorly located on the plum bob having electrical connection to the power source for selectively energizing the laser beam emitting member.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Figure 1:
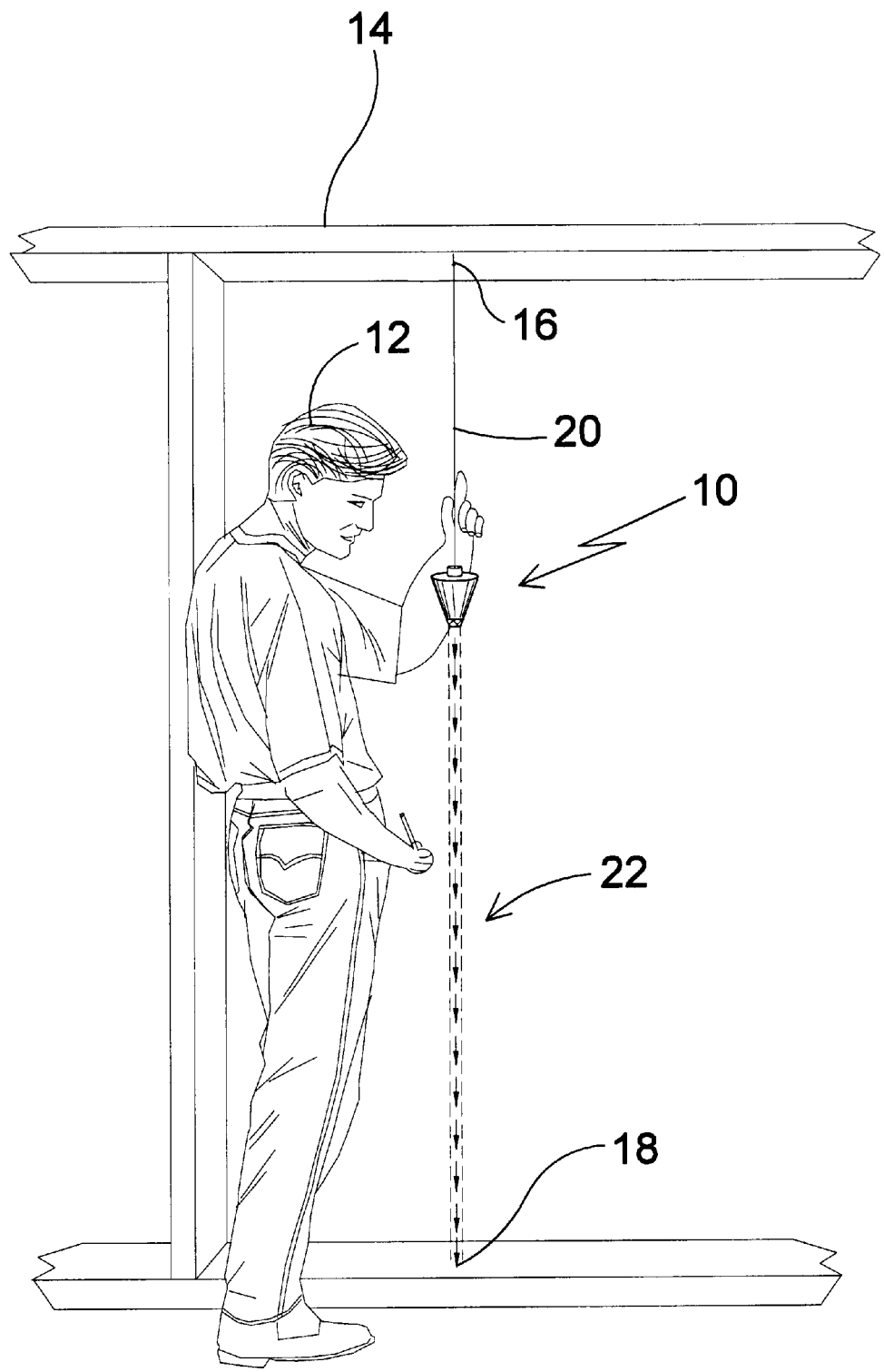
FIG. 1 is an illustrated perspective view of the present invention in use. Shown is a worker framing out a wall and preparing to vertically align a predetermined point on the underside of the top plate with the bottom plate. The laser-emitting plumb-bob is set up much the same as a conventional plumb-bob however it doesn't have to be lowered to a height just above the area to be marked. The laser-emitting plumb-bob is set at a height convenient for the user to handle while minimizing the oscillation that increases in direct proportion to the length of the suspension line. The laser is activated and a beam is projected downward to the bottom plate.

Once the laser-emitting plumb-bob is suspended the user presses the soft touch on/off switch which mates a contact from the switch mechanism with a contact attached to the rechargeable battery thereby completing the circuit to the laser cylinder and energizing the laser driver which creates an amount of light which is directed through a collimator and exits as a tight narrow beam. The beam is projected vertically downward and provides an accurate, easily visible alignment point.

LIST OF REFERENCE NUMERALS

Whith regard to reference numerals used, the following numbering is used throughout the drawings.
10 present invention
12 worker
14 wall
16 point on top plate
18 point on bottom plate
20 line
22 beam
24 switch
26 rechargeable receptacle
28 attachment means
30 tip
32 threads
34 cylinder
36 primary housing
38 threads
40 key
42 key way
44 battery posts
46 projection end
48 aperture
50 junction box
52 electrical wiring
54 laser cylinder compartment
56 laser driver
58 laser
60 collimator
62 power source

DESCRIPTION OF THE PREFERRED EMBODIMENT(S)

In order that the invention may be more fully understood, it will now be described, by way of example, with reference to the accompanying drawings in which FIGS. 1 through 7 illustrate the present invention being a laser-emitting plumb-bob.

Turning to FIG. 1, shown therein is an illustrated perspective view of the present invention 10 in use. Shown is a worker 12 framing out a stud wall 14 and preparing to vertically align a predetermined point on the underside of the top plate 16 with the bottom plate 18. The laser-emitting plumb-bob 10 is set up much the same as a conventional plumb-bob however it doesn't have to be lowered to a height just above the area to be marked. The laser-emitting plumb-bob 10 is set at a height convenient for the user to handle while minimizing the oscillation that increases in direct proportion to the length of the suspension line 20. The laser is activated and a beam 22 is projected downward to the bottom plate 18.

Figure 2:
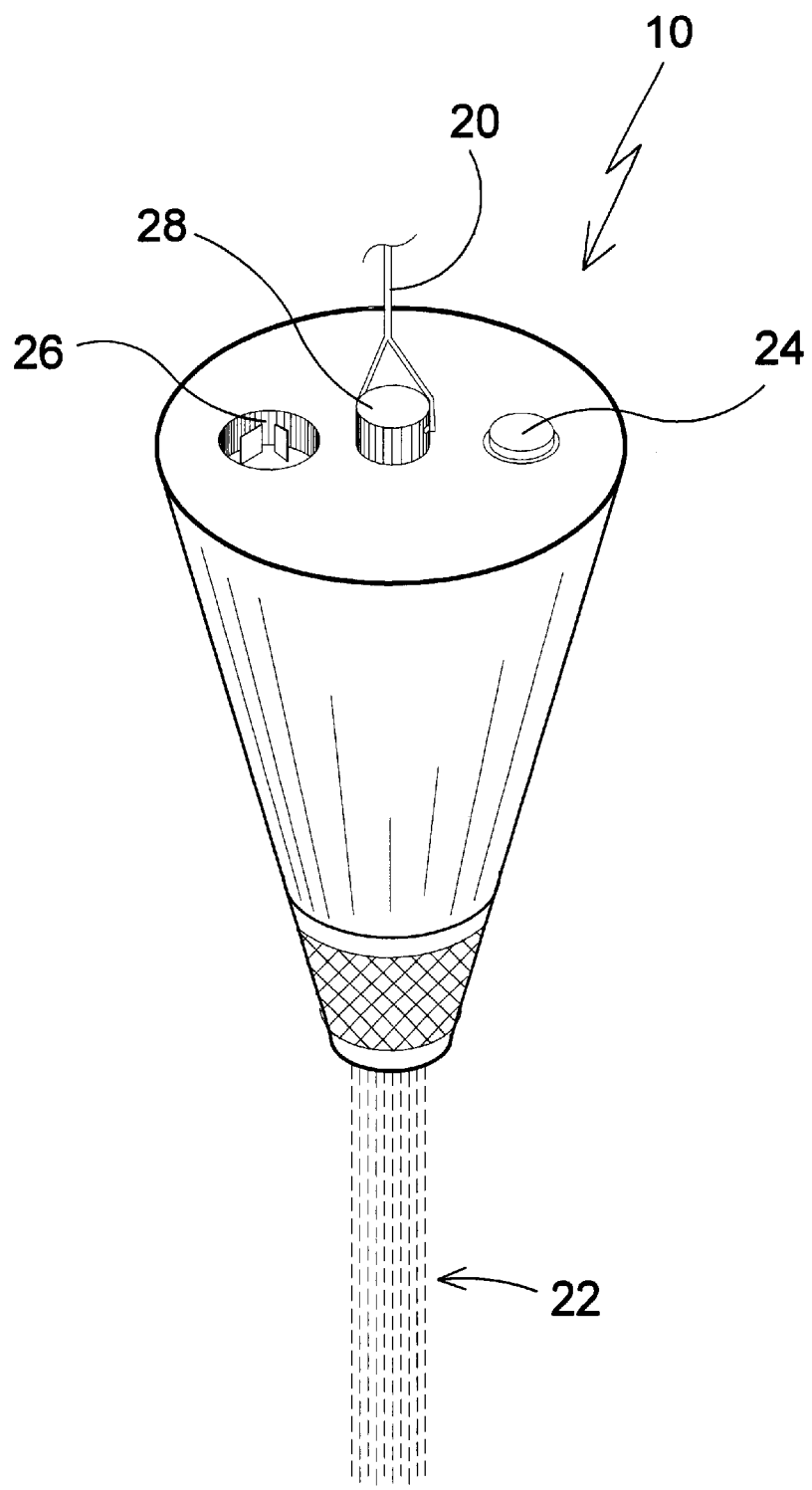
FIG. 2 is a detailed perspective view of the present invention in use, shown is the laser-emitting plumb-bob activated and projecting a concentrated beam of light downward. The suspension line is fastened to a post on top of the housing. The switch is located so as to be easily accessible at any time the apparatus is in use.

Turning to FIG. 2, shown therein is a detailed perspective view of the conventionally shaped plumb-bob of the present invention 10 in use. Shown is the laser-emitting plumb-bob 10 activated and projecting a concentrated beam of light 22 downward. The suspension line 20 and attachment means 28 are also shown. The on/off switch 24 is located so as to be easily accessible at any time the apparatus 10 is in use. The rechargeable receptacle 6 is also shown.

Figure 3:
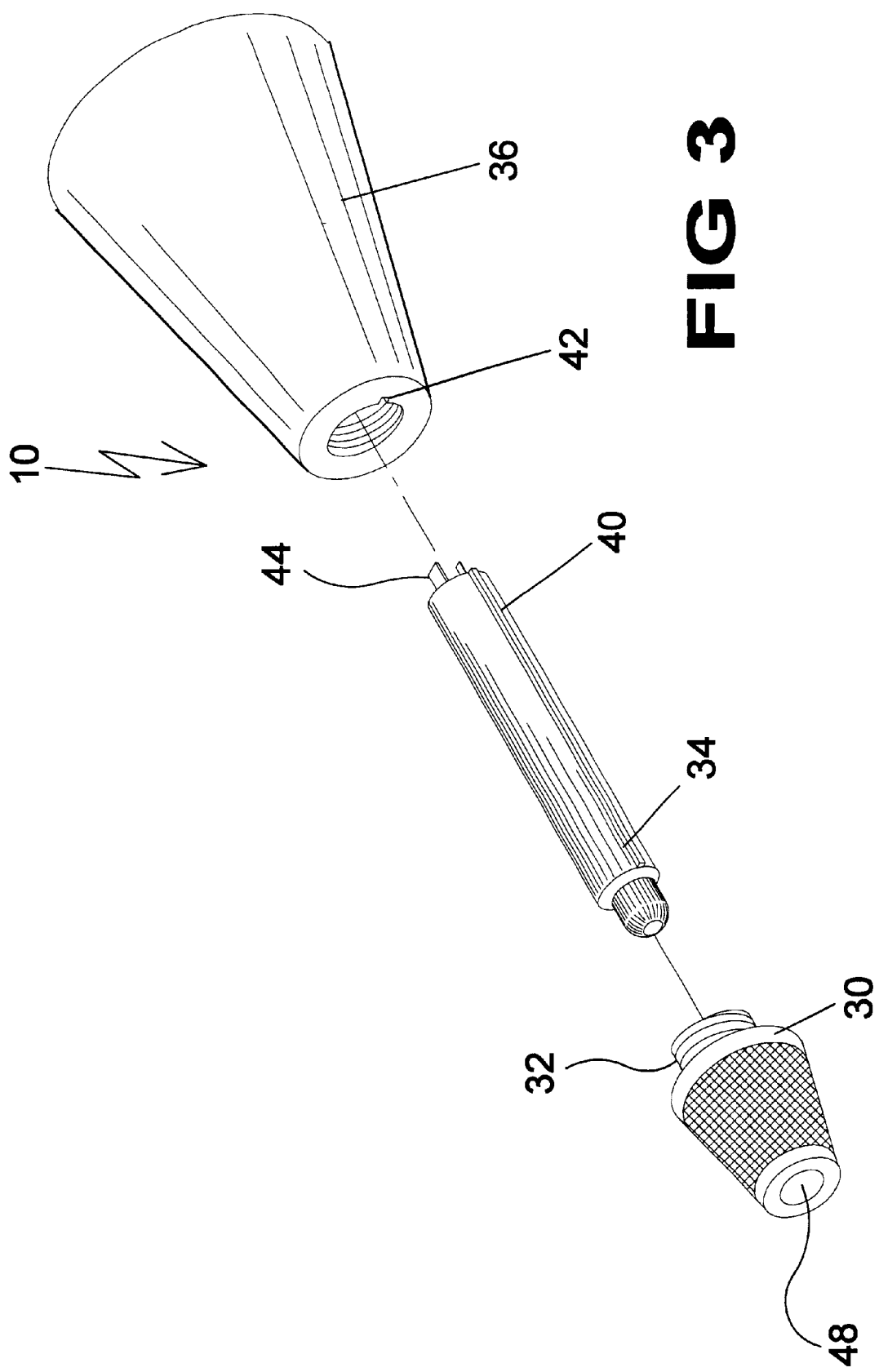
FIG. 3 is an exploded isometric view of the present invention, shown is the threaded tip that acts as a retaining cap for the laser cylinder and battery unit which is removed from their compartment inside the primary housing.

Turning to FIG. 3, shown therein is an exploded isometric view of the present invention 10. Shown is the threaded tip 30 with threads 32 and aperture 48 that act as a retaining cap for the laser cylinder 34 which houses the battery unit which is removed from their compartment inside the primary housing 36 with mating threads 38. Also shown is a key 40 on the laser cylinder 34 and mating key way 42 on the primary housing 36 along with battery posts 44.

Figure 4:
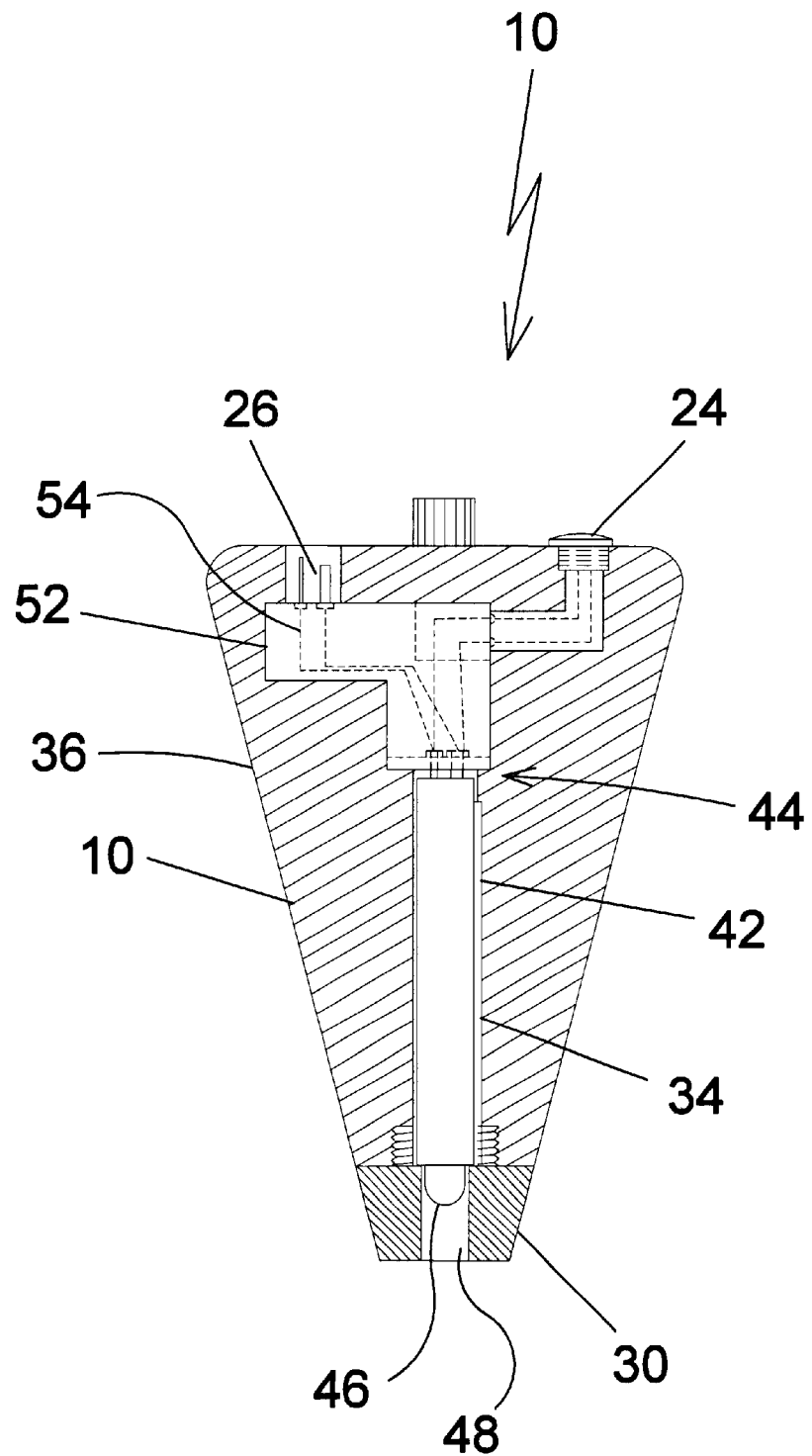
FIG. 4 is cross sectional view of the present invention; shown is the placement of the various components within the primary housing of the laser-emitting plumb-bob when in the off position. The threaded tip pushes the laser cylinder and battery unit against the battery which maintains pressure to insure a solid electrical connection. The projection end of the laser cylinder is retained by the threaded tip. A cylindrical recess extends centrally throughout the threaded tip to provide a passageway for the light to travel. The laser cylinder and battery unit has a contact on each end, one that remains in constant contact with the battery and one which only makes contact once the switch mechanism is activated thereby completing the circuit and generating the laser line. In this figure the switch mechanism is in the off position.

Turning to FIG. 4, shown therein is a cross sectional view of the present invention 10. Shown is the laser-emitting plumb-bob when in the off position. The threaded tip 30 pushes the laser cylinder 34 and battery unit against the battery posts 44 which maintains pressure to insure a proper electrical connection. The projection end 46 of the laser cylinder 34 is retained by the threaded tip 30. An aperture 48 extends centrally throughout the threaded tip 30 to provide a passageway for the light to travel. The laser cylinder 34 and battery unit has a contact on each end, one that remains in constant contact with the battery and one which only makes contact once the switch mechanism is activated thereby completing the circuit and generating the laser line. In this figure the switch mechanism 24 is in the off position. Junction box 52 positioned adjacent the top of the primary housing 36 contains most of the electrical components and electrical wiring 54. Other elements previously disclosed are also shown.

Figure 5:
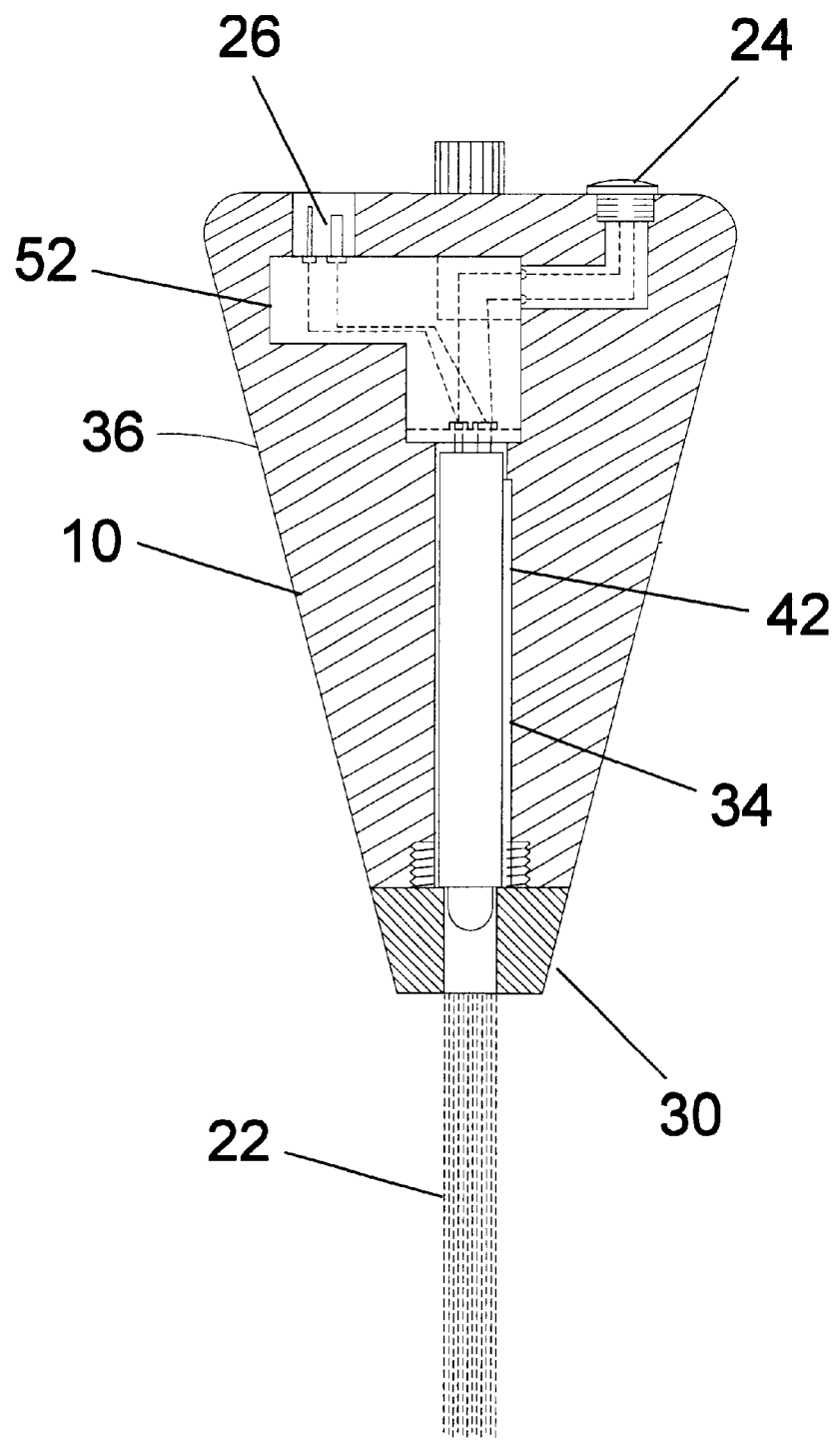
FIG. 5 is cross sectional view of the present invention. Shown is the placement of the various components within the primary housing of the laser-emitting plumb-bob when in the on position. The contact on the switch mechanism is mated with the contact on the laser cylinder battery unit thus completing the circuit and activating the laser.

Turning to FIG. 5, shown therein is a cross sectional view of the present invention 10. Shown is the laser-emitting plumb-bob 10 when in the on position. The switch mechanism 24 is in the on position thus completing the circuit and activating the laser beam 22. Other elements previously disclosed are also shown.

Figure 6:
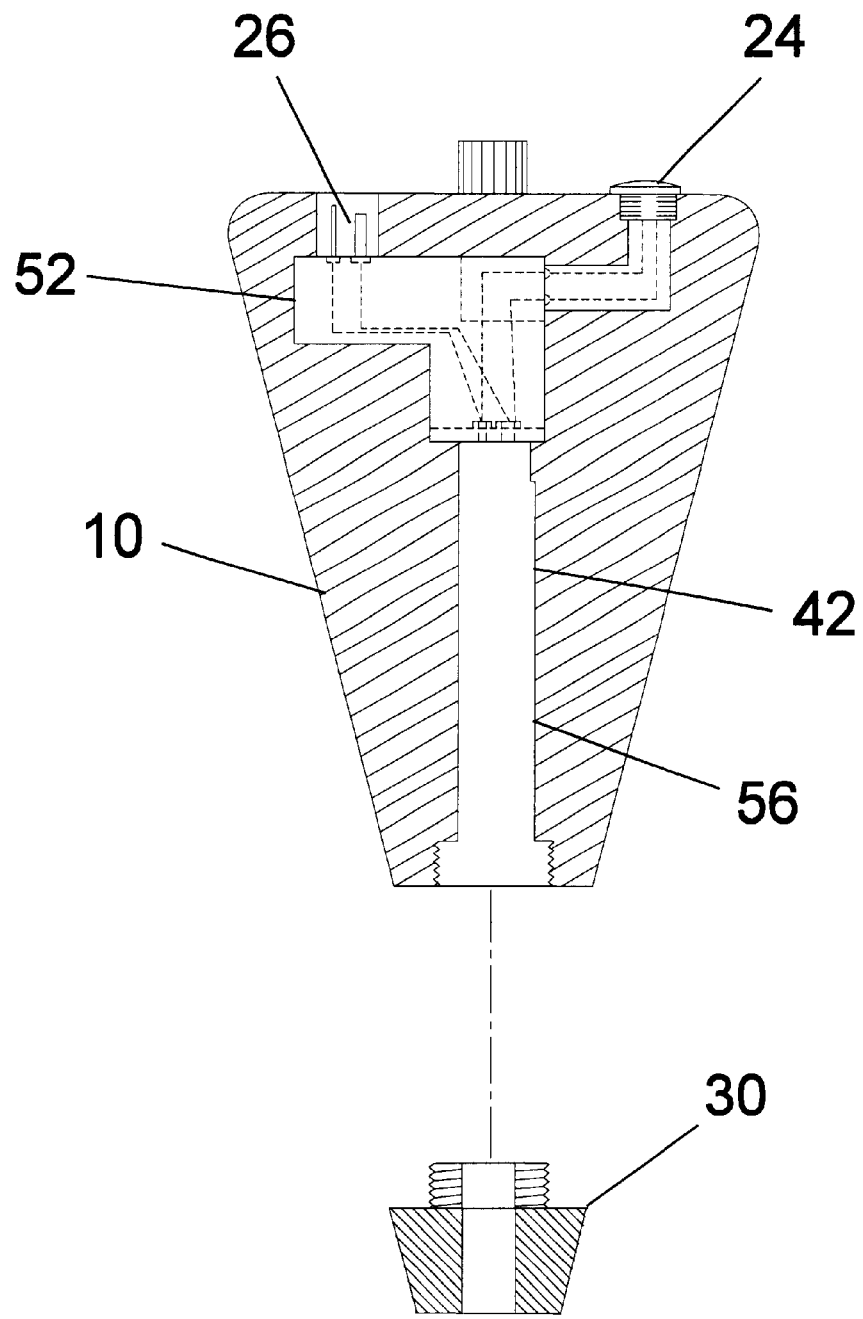
FIG. 6 is a cross sectional side view of the present invention when in a non-operational mode. The threaded tip has been removed releasing the laser cylinder and battery unit and leaving the interior compartment empty.

Turning to FIG. 6, shown therein is a cross sectional side view of the present invention 10 when in a non-operational mode. The threaded lip 30 has been removed releasing the laser cylinder and battery unit and leaving the interior compartment 56 empty which compartment or cavity extends from the tip 30 to the junction box 52. Other elements previously disclosed are also shown.

Figure 7:
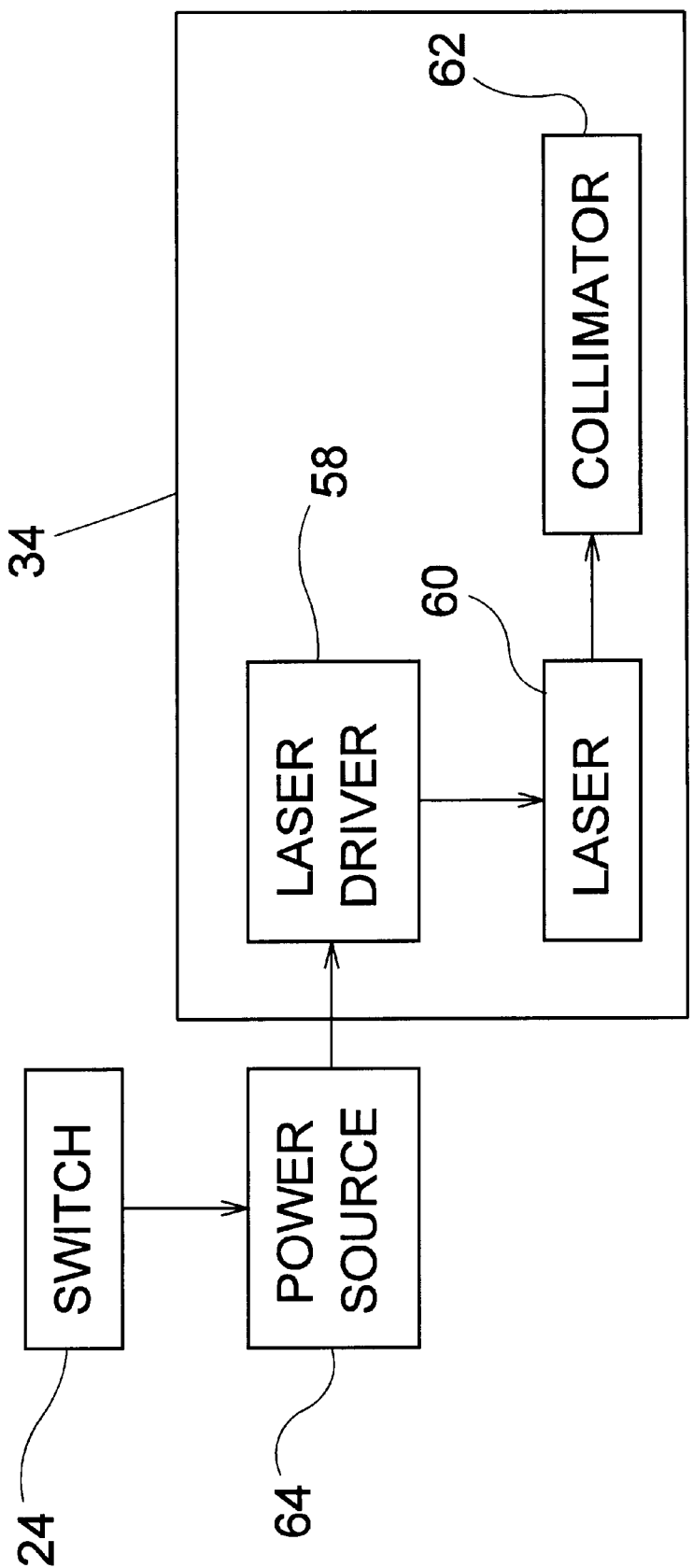
FIG. 7 is a diagrammatic view of the circuit components of the laser-emitting plumb-bob. The soft-touch switch is depressed and completes the circuit to supply power to the laser cylinder. A laser driver generates an amount of light which is directed through a collimator and exits as a tight narrow beam which can travel over the necessary distance.

Turning to FIG. 7, shown therein is a diagrammatic view of tile circuit components of the laser-emitting plumb-bob. The soft-touch switch 24 is depressed and completes the circuit to the supply power 64 and the laser cylinder 34. A laser driver 58 and laser 60 generate an amount of light which is directed through a collimator 62 and exits as a tight narrow beam which can travel over the necessary distance.

In operation, the laser-emitting plumb-bob is suspended while the user presses the soft touch on/off switch which actuates the rechargeable battery thereby completing the circuit to the laser cylinder and energizing the laser driver which creates an amount of light which is directed through a collimator and exits as a tight narrow beam. The beam is projected vertically downward and provides an accurate, easily visible alignment point.

I claim:

1. An apparatus for a plumb-bob and suspension line, comprising:
   a) a conical shaped housing, said housing being wider at its top end and having a flat top end, said housing being substantially pointed on its lower end;
   b) a means for generating a laser beam, said means being cylindrically shaped, said means for generating a laser beam having within a laser driver and a battery;

c) said housing having a centrally positioned cavity therein for receiving said cylindrically shaped means for generating a laser beam, said cavity having a keyway and said means for generating a laser beam having a key for engaging said keyway;

d) a removable, threadably attached tip disposed on said lower end of said housing, said tip having a central aperture therein, said aperture for permitting said laser beam to pass therethrough;

e) said battery being a power source for said laser driver;

f) an on/off soft touch switch, whereby said means for generating a laser beam is controlled;

g) means for electrically connecting said laser driver, said battery, and said switch;

h) a junction box disposed internal said housing, said junction box disposed adjacent said top end of said housing connected to a top end of said cavity, said junction box housing a portion of said electrically connecting means;

i) said flat top end of said housing having a centrally located attachment for said suspension line protruding upwardly, a socket for recharging said battery located on one side of said attachment and said switch located on the opposite side of said attachment;

j) said junction box having radially extending passageways for connection to said switch and said socket on said top end of said housing.

* * * * *